United States Patent [19]

Anderson

[11] 4,017,273

[45] Apr. 12, 1977

[54] PYROLYSIS PROCESS FOR CONVERTING REFUSE TO FUEL GAS

[75] Inventor: John Erling Anderson, Katonah, N.Y.

[73] Assignee: Union Carbide Corporation, New York, N.Y.

[22] Filed: May 26, 1976

[21] Appl. No.: 690,187

[52] U.S. Cl. .................................. 48/209; 48/111; 110/8 R; 241/DIG. 38; 252/373

[51] Int. Cl.² .......................................... C10J 3/00

[58] Field of Search ............ 48/209, 111; 252/373; 110/8 R, 18 R; 241/DIG. 38

[56] References Cited

UNITED STATES PATENTS 3,639,111  2/1972  Brink et al. .......................... 48/209
3,841,851  10/1974  Kaiser .................................. 48/209

Primary Examiner—Robert L. Lindsay, Jr.
Assistant Examiner—George C. Yeung
Attorney, Agent, or Firm—Lawrence G. Kastriner

[57] ABSTRACT

This invention relates to improving the known process for disposing of refuse while simultaneously producing a useful gaseous product and an inert solid residue in a shaft furnace in which refuse is fed into the top portion of said furnace, an oxygen containing gas is fed into the base, and in which the organic portion of the refuse is pyrolized to char, oils and gas containing a high concentration of CO and $H_2$, and the inorganic portion of the refuse is fluidized and tapped from the base of the furnace.

The improvement in the above-described process comprises removing a portion of the char from the furnace while retaining a sufficient amount of combustible materials in the furnace to satisfy the energy requirements of the process. The improvement permits a reduction in the oxygen requirements of the process and has a beneficial effect on the specific heating value of the fuel gas produced.

2 Claims, 1 Drawing Figure

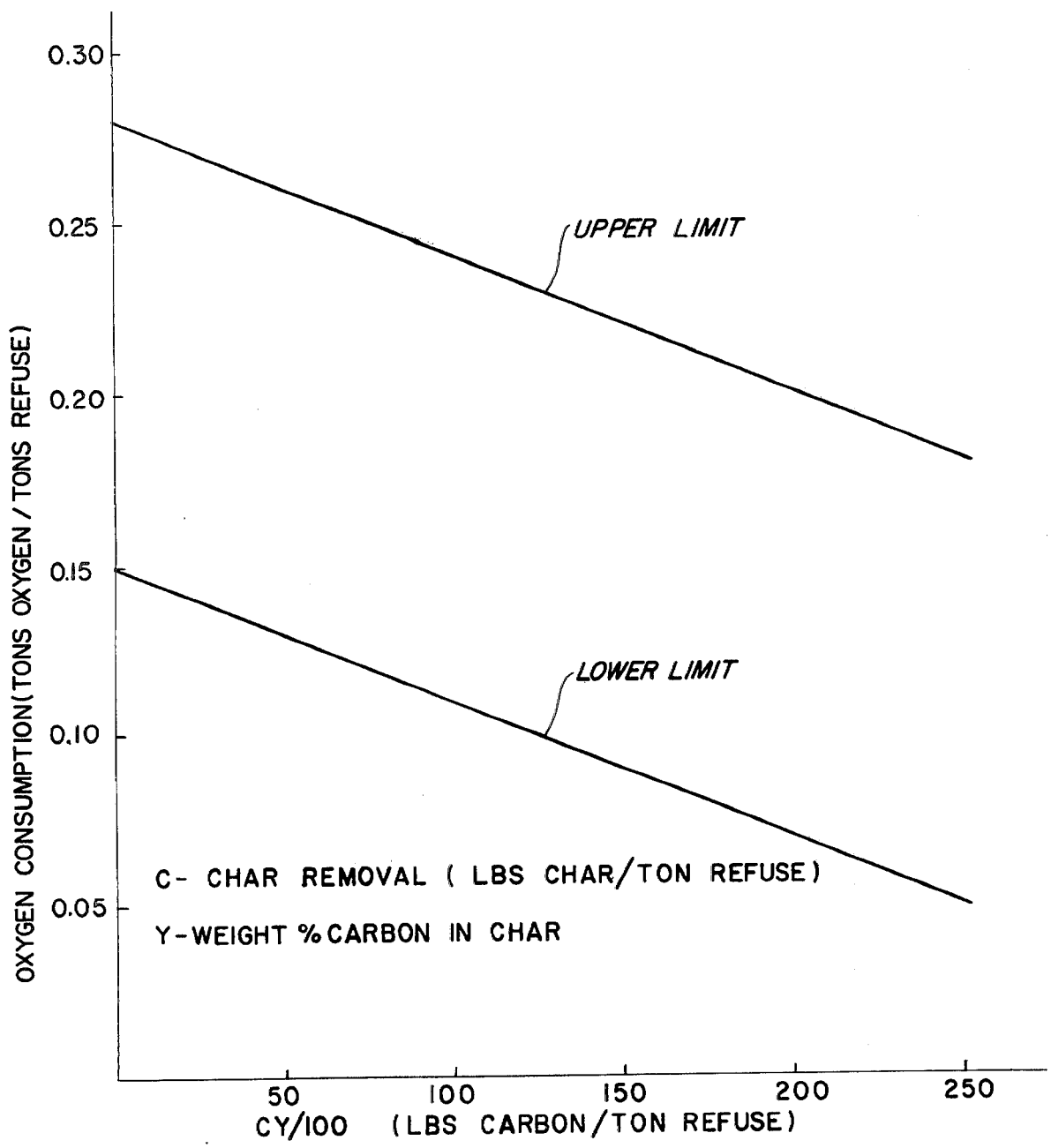

PYROLYSIS PROCESS FOR CONVERTING REFUSE TO FUEL GAS

BACKGROUND

This invention relates in general to a solid waste disposal and resource recovery process which produces a useful fuel or chemical synthesis gas, and more particularly, to an improvement upon the process disclosed in U.S. Pat. No. 3,729,298, hereinafter referred to as the Anderson process.

Historically, the least expensive method for disposing of solid waste has been open dumping. However, unprocessed garbage dumps produce severe problems of ground water pollution through leaching, loss of land value, fire hazards and rodent infestation. A more acceptable method, sanitary landfilling has reduced these problems by composting and covering the garbage with earth. Nevertheless, in large metropolitan areas, this practice has become increasingly unattractive, as acceptable sites become more scarce. Both of these methods have been supplemented by incinerating the waste before landfilling. While conventional incineration provides significant reductions in the volume of the refuse and some alleviation of the pollution caused by leaching, it introduces new environmental problems such as air pollution, and though volume reductions of 80 to 90 percent are possible, the residue or ash is not biologically inactive and therefore landfilling is still required. Furthermore, resource recovery from conventional incineration tends to be minimal.

A highly desirable solution to the above problems is disclosed and claimed in U.S. Pat. No. 3,729,298; the disclosure of which is incorporated herein by reference. In summary, the Anderson process disclosed in said patent comprises feeding refuse into the top portion, and oxygen into the base of a vertical shaft furnace. The furnace (or converter) has three functional zones; a drying zone at the top, a thermal decomposition or pyrolysis zone in the middle, and a combustion and melting zone (or hearth) at the base. As the refuse slowly descends in the furnace, it is first dried by the hot gas which rises through the furnace, and then pyrolyzed. Pyrolysis is a process whereby organic matter in the refuse is thermally decomposed and cracked in an oxygen-deficient atmosphere, with the generation of char, oils and a gas containing a high concentration of CO and $H_2$. As the refuse moves down through the pyrolysis zone, it is converted to volatile materials which rise and char which descends into the combustion zone. There the char is combusted with oxygen, causing the generation of carbon monoxide and carbon dioxide which produce the heat required to melt the inorganic solids in the refuse, such as glass and metal. The molten residue is continuously tapped from the furnace hearth and quenched in a water bath. A gas, consisting of at least 50% CO plus $H_2$ (on a dry basis) is discharged from the top of the furnace. Following cleanup, the gas is ready for use as a medium BTU fuel gas or for chemical synthesis.

In the above-described Anderson process, oxygen is required in the furnace for two purposes. One is to gasify the char by oxidation, to form primarily carbon monoxide; and the second is to supply heat by combustion to satisfy the energy requirements of the process.

The oxygen containing gas required in the above-described Anderson process must contain at least 40% oxygen by volume in order that it supply sufficient energy to the hearth to melt the inorganic solids. Such a gas may be made by enriching air with oxygen. Oxygen concentrations greater than 40% may also be used, with commercial oxygen being the most preferred from a technical point of view. Economics will dictate the exact amount of oxygen, between the limits of 40 to 100%, to be used in a given situation, which will depend also on the composition and moisture content of the refuse.

As pointed out in detail in U.S. Pat. No. 3,729,298 (note particularly column 6, lines 23–42) Anderson found the weight ratio of oxygen to refuse fed into the shaft furnace to be an important parameter of his process. Specifically, Anderson found that his process could be operated very efficiently at low ratios of oxygen to refuse, namely, a weight ratio of oxygen to refuse entering the shaft furnace in the range of from about 0.15:1 to 0.28:1.

The advantages afforded by the Anderson process resulting from the use of low ratios of oxygen to refuse are numerous. Most obvious is the cost savings associated with low ratios of oxygen to refuse; namely, minimizing the cost of oxygen. Further advantages which result relate to the composition of combustible gas leaving the shaft reactor. Operating within the weight ratio of oxygen/refuse in the range of 0.15:1 to 0.28:1 in the reactor, viz, an amount substantially less than required for the stoichiometric combustion of the refuse, results in the production of a gas having a high concentration of combustible constituents such as carbon monoxide and hydrogen. Thus, the gas can be used as a chemical synthesis gas, such as, for example, in the synthesis of methanol or as a reducing gas in applications, such as the reduction of iron ore pellets to metallic iron. Alternatively, the fuel energy of the combustible gas can be utilized to advantage by burning the gas completely.

OBJECTS

An object of this invention is to provide an improvement in the Anderson process by the partial removal of char from the furnace.

It is another object of this invention to lower the ratio of oxygen to refuse required by the Anderson process.

A further object of this invention is to provide an improvement in the Anderson process by the partial removal of char whereby the specific heating value of the fuel gas produced is raised.

Other objectives of the invention will be apparent from the discussion which follows.

DRAWINGS

FIG. 1 is a graph showing the range of oxygen consumption as a function of char removal.

SUMMARY OF INVENTION

The above and other objects which will be apparent to those skilled in the art are achieved by the present invention which comprises:

In a process for disposing of refuse while simultaneously producing a useful gaseous product and an inert solid residue, comprising the steps of (a) feeding refuse into the top portion of a vertical shaft furnace, (b) feeding an oxygen containing gas into the base of said furnace, (c) pyrolyzing the organic portion of the refuse, (d) fluidizing the inorganic portion of the refuse, (e) discharging the gaseous products from the top of said furnace, and (f) tapping the fluidized inorganic material from the base of said furnace, the improvement comprising:

removing char from the furnace in an amount such that oxygen consumption in said process is reduced, while retaining a sufficient amount of combustible materials in the furnace so that on oxidation thereof the energy requirements of the process are satisfied, the amount of char removed (lbs. char/ton refuse) being less than the value of 50X/Y, where:

X = lbs. carbon contained in a ton of refuse
Y = weight percent (%) carbon in the char and wherein the range of oxygen consumption for a given amount of char removed will be within the values determined by the equation:
$R = B - (4 \times 10^{-6})(CY)$ where:

R = oxygen consumption (tons oxygen/ton refuse)
C = char removal (lbs. char/ton refuse)
Y is the same as above and B can vary between 0.15 and 0.28.

In accordance with a preferred embodiment, the amount of char that is removed is between the values of 10 X/Y and 30 X/Y.

DETAILED DESCRIPTION OF THE INVENTION

It has been found that the objectives of this invention may be realized by operating the Anderson process in such a manner that the char produced by the pyrolysis reaction, i.e., by the decomposition and thermal cracking of organic matter, is partially removed from the furnace. By such controlled char removal a lower ratio of oxygen to refuse than heretofor required may be used, thereby improving the overall efficiency of the Anderson process as compared to its operation without char removal.

In carrying out the present invention, care must be exercised to make certain that the amount of combustible materials (primarily char, CO, $H_2$) remaining in the furnace are sufficient so that the energy requirements of the process provided by oxidation of the combustibles will be satisfied. These energy requirements are based on the need to melt or fluidize the inorganic matter (e.g., metal and glass), to pyrolyze and gasify the organic portion of the refuse, to vaporize the water, and to supply the heat loss from the furnace through radiation and sensible heat loss in the off gases and tapped molten residue of metal and slag.

In practicing the present invention, the char may be removed by any suitable manner. A preferred way of removing the char is by carrying it out entrained in the product gas and then separating it from the gas by use of a water-scrubber or other solid-gas separating techniques known in the art. The char, obtained from the organic portion of the refuse, is composed mostly of carbon, hydrogen, oxygen and ash. Its exact composition depends upon the operating conditions within the furnace, the point of char removal, etc. The main component in char is carbon.

In practicing the present invention, the range of oxygen feed rates that should be used will depend upon the amount of char that is being removed. The graph accompanying the present specification shows the range of oxygen consumption as a function of char removal. From the graph it is seen that when no char is removed the ratio of oxygen to refuse is that taught by U.S. Pat. No. 3,729,298, to Anderson, i.e., from 0.15:1 to 0.28:1 tons oxygen/ton refuse. However, when char is removed in accordance with the present invention the range of oxygen consumption is reduced significantly. For example, when the char is removed to an extent that the amount of carbon in the char removed is 150 lbs. per ton of refuse, the range of oxygen consumption is reduced to 0.09:1 to 0.22:1 tons of oxygen/ton of refuse. The char that is removed can be used for example, as a reducing agent or as fuel.

While the present invention is not limited to any theory of operation, a possible explanation for the highly desirable reduction in oxygen consumption achieved by the present invention is as follows. The oxidation of char to form carbon monoxide is not as thermally efficient in the use of oxygen as competing gas combustion reactions. This is illustrated by the following reactions:

| | Heat of Reaction (BTU/lb Oxygen) |
|---|---|
| $C + \frac{1}{2} O_2 \longrightarrow CO$ | 2964 |
| $CO + \frac{1}{2} O_2 \longrightarrow CO_2$ | 7601 |
| $H_2 + \frac{1}{2} O_2 \longrightarrow H_2O (g)$ | 6446 |

The combustion of CO to $CO_2$ and $H_2$ to $H_2O$ releases more energy per pound of oxygen consumed than that obtained from burning carbon to CO. As char is removed from the furnace, a greater portion of the oxygen reacts with the gaseous fuel in the hearth (CO + $H_2$). This results in more combustion energy being released per pound of oxygen and, therefore, less oxygen is needed to supply the energy requirements of the furnace.

Not only does the removal of char permit a reduction in oxygen consumption, but it also has a beneficial effect on the specific heating value of the fuel gas produced (measured in BTU/CF for dry gas at 70° F and atmospheric pressure). The fuel gas is produced in the furnace principally by two mechanisms. One is pyrolysis of the organic portion of the refuse, and the second is oxidation of the char to carbon monoxide. The pyrolysis reaction releases a fuel gas which has a specific heating value of about 400–500 BTU/CF. The carbon monoxide formed by the oxidation of the char has a specific heating value of about 310 BTU/CF. The gases produced by pyrolysis and char oxidation combine being discharged from the furnace as a fuel gas with specific heating value between that for the separate gases produced by each of the two mechanisms. As char is removed from the furnace, the amount of the lower specific heating value gas produced by char oxidation is reduced in proportion to the higher specific heating value gas produced by pyrolysis. The net effect of this is that the specific heating value of the combined furnace off gas is increased, with the result that the utility and economic value of the fuel gas produced in the furnace is enhanced.

The process of the present invention can be practiced utilizing the basic process described in U.S. Pat. No. 3,729,298, but with the modification that for example, 200 lbs. char/per ton of incoming refuse is removed from the furnace. If the char contains 75% by weight carbon, it would permit one to operate within the range of oxygen consumption of 0.09:1 to 0.22:1 tons oxygen/ton refuse as shown on the graph.

What is claimed is:

1. In a process for disposing of refuse while simultaneously producing a useful gaseous product and an inert solid residue, comprising the steps of (a) feeding refuse into the top portion of a vertical shaft furnace, (b) feeding an oxygen containing gas into the base of said furnace, (c) pyrolyzing the organic portion of the refuse, (d) fluidizing the inorganic portion of the refuse, (e) discharging the gaseous products from the top of said furnace, and (f) tapping the fluidized inorganic material from the base of said furnace, the improvement comprising:

removing char from the furnace in an amount such that oxygen consumption in said process is reduced, while retaining a sufficient amount of combustible materials in the furnace so that on oxidation thereof the energy requirements of the process are satisfied, the amount of char removed (lbs. char/ton refuse) being less than the value of 50X/Y, where:

X = lbs. carbon contained in a ton of refuse

Y = weight percent (%) carbon in the char and wherein the range of oxygen consumption for a given amount of char removed will be within the values determined by the equation:

$R = B - (4 \times 10^{-6})(CY)$ where:

R = oxygen consumption (tons oxygen/ton refuse)

C = char removal (lbs. char/ton refuse)

Y is the same as above, and B can vary between 0.15 and 0.28.

2. A process according to claim 1 wherein the amount of char removed is between the values of 10X/Y and 30X/Y.

* * * * *